United States Patent
Kashio et al.

(10) Patent No.: US 9,145,103 B2
(45) Date of Patent: Sep. 29, 2015

(54) HEAD-PROTECTING AIRBAG DEVICE

(71) Applicant: TOYODA GOSEI CO., LTD., Kiyosu-shi, Aichi-ken (JP)

(72) Inventors: Atsushi Kashio, Kiyosu (JP); Sho Ikenohata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/595,495

(22) Filed: Jan. 13, 2015

(65) Prior Publication Data

US 2015/0210241 A1 Jul. 30, 2015

(30) Foreign Application Priority Data

Jan. 28, 2014 (JP) .................................. 2014-013753

(51) Int. Cl.
*B60R 21/16* (2006.01)
*B60R 21/237* (2006.01)
*B60R 21/231* (2011.01)

(52) U.S. Cl.
CPC ............. *B60R 21/237* (2013.01); *B60R 21/231* (2013.01); *B60R 2021/161* (2013.01)

(58) Field of Classification Search
USPC ....................... 280/730.1, 730.2, 743.1, 743.2
See application file for complete search history.

(56) References Cited

U.S. PATENT DOCUMENTS

| | | | | |
|---|---|---|---|---|
| 6,808,199 B2* | 10/2004 | Saderholm et al. | ......... | 280/730.2 |
| 7,641,220 B2* | 1/2010 | Visker et al. | ................ | 280/728.2 |
| 8,851,507 B1* | 10/2014 | Kemp et al. | ................ | 280/728.2 |
| 2003/0094798 A1* | 5/2003 | Ogata et al. | ................ | 280/730.2 |
| 2004/0000775 A1* | 1/2004 | Henderson et al. | ......... | 280/730.2 |
| 2008/0252047 A1* | 10/2008 | Fink | .......................... | 280/728.2 |
| 2009/0102166 A1* | 4/2009 | Brown et al. | .............. | 280/728.2 |
| 2014/0265273 A1* | 9/2014 | Furusawa et al. | .......... | 280/730.2 |

FOREIGN PATENT DOCUMENTS

| | | |
|---|---|---|
| JP | 2006-117123 A | 5/2006 |
| JP | 2011-073562 A | 4/2011 |

\* cited by examiner

*Primary Examiner* — Toan To
(74) *Attorney, Agent, or Firm* — Posz Law Group, PLC

(57) ABSTRACT

An airbag is housed in a housing area in the shape of a folded-up body which is obtained as a result of folding the airbag by bringing the lower edge close to the upper edge and elongated in a front and rear direction. A displacement-preventing means is provided at a peripheral portion of the airbag constituting an outer peripheral edge of the airbag for preventing a tape member wrapped around the folded-up body from supping against the folded-up body. The means is formed at an upper end region of the peripheral portion which will be an upper edge of the airbag at deployment and at least either in front of or at the rear of the tape member. The means is comprised of a recessed region or a projecting region that is formed on the airbag itself so as to be engageable with an end edge of the tape member.

8 Claims, 9 Drawing Sheets

Fig. 8
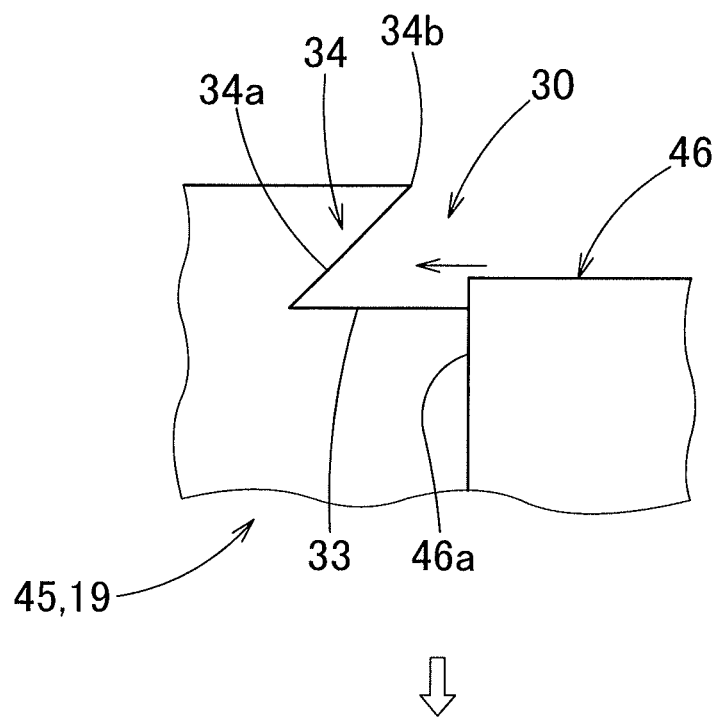
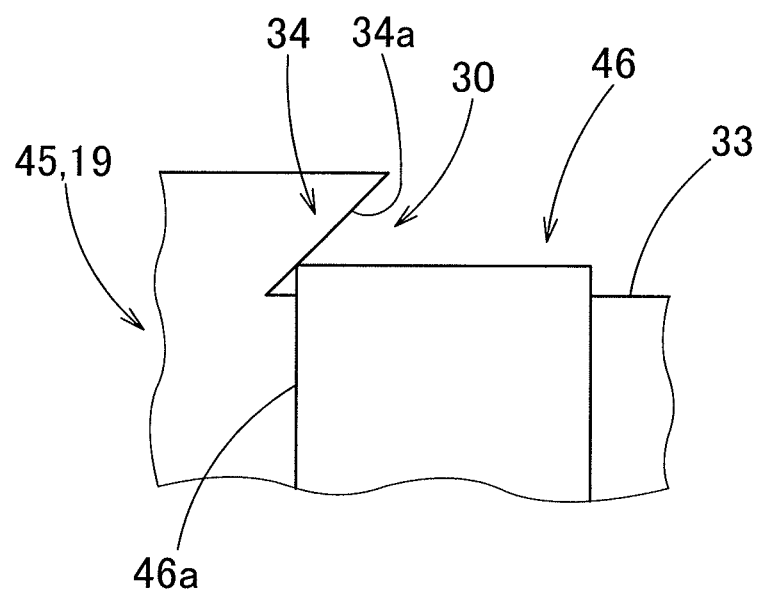

HEAD-PROTECTING AIRBAG DEVICE

CROSS REFERENCE TO RELATED APPLICATIONS

The Present application claims priority from Japanese Patent Application No. 2014-013753 of Kashio et al., filed on Jan. 28, 2014, the disclosure of which is hereby incorporated into the present application by reference.

BACKGROUND OF THE INVENTION

1. Field of the Invention

The present invention relates to a head-protecting airbag device including an airbag that is mountable on an upper periphery of a window of a vehicle at an inboard side of the window in a folded-up configuration and is deployable over the window when fed with an inflation gas.

2. Description of Related Art

An airbag used in a head-protecting airbag device is folded up from an unfolded or flattened state and reduced in size in an up and down direction so as to be housed in a housing area of a vehicle. Specifically, the airbag is folded up by bringing the lower end region toward the upper end region. JP2006-117123 discloses an airbag which has some heterologous yarns inwoven generally vertically such that the folding can be conducted following the yarns as markers.

JP2011-73562 discloses an airbag which are bound by tearable tape members at a plurality of positions in a front and rear direction for keeping the folded-up configuration.

In the first prior art as well as in the second, the airbags for use in a head-protecting airbag device require a certain member to keep the airbag in a folded-up configuration and prevent the folded-up configuration from collapsing after the folding. If a tape member is used as the member for keeping a folded-up configuration and wrapped around an airbag as completely folded up, the tape member may sometimes slip and be displaced considerably relative to the airbag. Therefore, an improvement has been expected in order to prevent such displacement of the tape member.

SUMMARY OF THE INVENTION

An object of the present invention is to provide a head-protecting airbag device that is capable of preventing a tape member wrapped around an airbag for keeping a folded-up configuration of the airbag from being displaced.

The object of the invention will be achieved by the following head-protecting airbag device:

The head-protecting airbag device includes an airbag that is adapted to be housed in a housing area located at an upper periphery of a window of a vehicle on an inboard side of a vehicle. The airbag is inflatable with an inflation gas and deployable over an inboard side of the window. The airbag includes:

a folded-up body that is a state of the airbag obtained as a result of folding the airbag in such a fashion as to bring a lower edge of the airbag close to an upper edge of the airbag, the folded-up body being so elongated as to extend generally along a front and rear direction of a vehicle, and being to be wrapped by a tearable tape member that is formed into a flexible band and is wrapped generally along a circumferential direction of the folded-up body in order to prevent a folded-up configuration of the folded-up body from collapsing;

a gas admissive portion that is inflatable with an inflation gas in such a fashion as to separate an inboard side wall deployable at an inboard side from an outboard side wall deployable at an outboard side;

a non-admissive portion that admits no inflation gas, the non-admissive portion including a peripheral portion that constitutes an outer peripheral edge of the airbag; and displacement-preventing means for preventing the tape member from being displaced relative to the folded-up body, the displacement-preventing means being formed at an upper end region of the peripheral portion which will be an upper edge of the airbag at deployment, the displacement-preventing means comprising a recessed region or a projecting region that is formed on the airbag itself at least either in front of or at the rear of a location at which the tape member is to be wrapped so as to be engageable with an end edge of the tape member and prevent the tape member from being displaced.

The head-protecting airbag device according to the invention includes at the upper end region of the peripheral portion which will be the upper edge of the airbag at deployment the displacement-preventing means that prevents the tape member from being displaced relative to the folded-up body. Therefore, the tape member will be prevented from slipping considerably against the folded-up body. The displacement-preventing means will prevent the displacement of the tape ember until the folded-up body is mounted on a vehicle in an instance using such a tape member that has no adhesive layer and is merely wrapped around the folded-up body and connected at the opposite ends. Further, since the displacement-preventing means is provided by forming a recessed region or a projecting region in the airbag itself, it can be formed merely by changing the outer contour of the airbag when cutting the airbag out of a base cloth, and requires no separate parts, which will not increase the manufacturing cost and the number of parts.

Therefore, the head-protecting airbag device of the invention will be capable of preventing the tape member for keeping the folded-up body in a folded-up configuration from being displaced considerably.

In the head-protecting airbag device of the invention, it is desired that the displacement-preventing means includes a bound region at which the tape member is wrapped around the folded-up body and a pair of rising regions which are so configured as to rise from the bound region in front of and at the rear of the tape member, such that end surfaces of the rising regions facing towards the tape member serve as regulating surfaces that are engageable with the end edges of the tape member and prevent the displacement of the tape member.

With this configuration, although the tape member is likely to move forward or backward relative to the folded-up body, the rising regions so configured as to rise from the bound region in front of and at the rear of the tape member will engage with the end edges of the tape member and adequately hold the tape member from slipping forward or backward, thereby preventing the tape member from moving forward or backward relative to the folded-up body.

It is further desired that the displacement-preventing means is formed by cutting an edge portion out of the upper end region of the peripheral portion, and that the regulating surfaces of the rising regions located in front of and at the rear of the tape member are so inclined relative to a left and right direction that the leading ends of the regulating surfaces are directed toward the tape member, toward a center in a front and rear direction between the regulating surfaces.

With this configuration, when the tape member moves forward or backward relative to the folded-up body, the tape member will fit into an acute-angled corner formed between the regulating surfaces which are so inclined as to direct the leading ends inward in a front and rear direction and a bottom of the cutout region which constitutes the bound region at which the tape member is wrapped, such that the tape member will stay held at peripheral regions of the regulating surfaces and be adequately prevented from climbing over the peripheral regions of the regulating surfaces. That is, the displacement-preventing means of the invention will further adequately prevent the tape member from slipping considerably forward or backward against the folded-up body.

BRIEF DESCRIPTION OF DRAWINGS

FIG. 8 schematically illustrates the way the tape member moves forward on the folded-up body;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
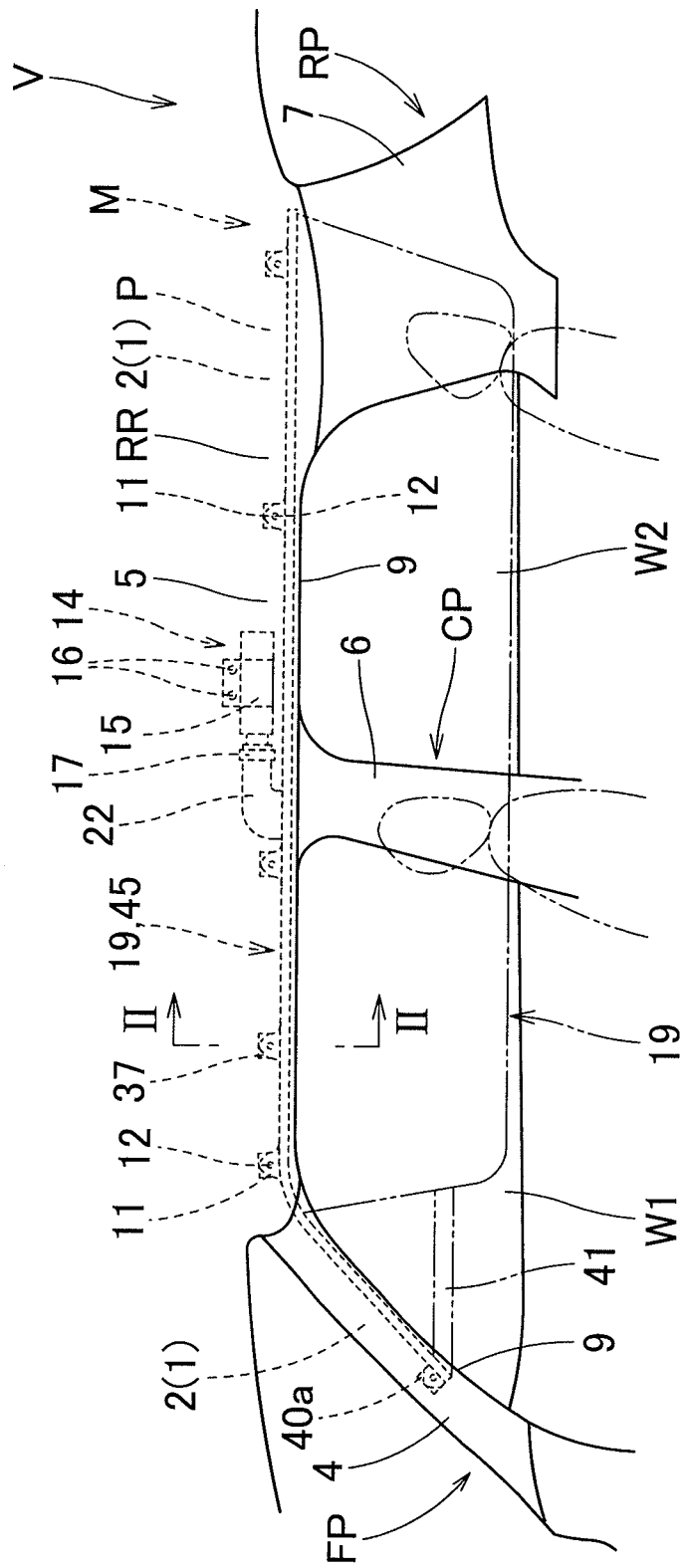
FIG. 1 is a schematic front view of a head-protecting airbag device embodying the invention as viewed from a vehicle interior.

As shown in FIG. 1, a head-protecting airbag device M embodying the present invention is mounted on a vehicle V with two windows (side windows) W1 and W2, i.e., with two rows of seats. The head-protecting airbag device M includes an airbag 19, an inflator 14, mounting brackets 11, a mounting bracket 15, an airbag cover 9 and a tape member 46 which is wrapped around the airbag 19 as is completely folded up, namely a folded-up body 45 as described later. The airbag 19 is housed in a housing area P located at upper peripheries of the windows W1 and W2 at an inboard side of the vehicle V in a folded-up configuration, specifically from a lower periphery of a front pillar FP to a region above a rear pillar RP, via a lower periphery of a roof side rail RR.

Figure 2:
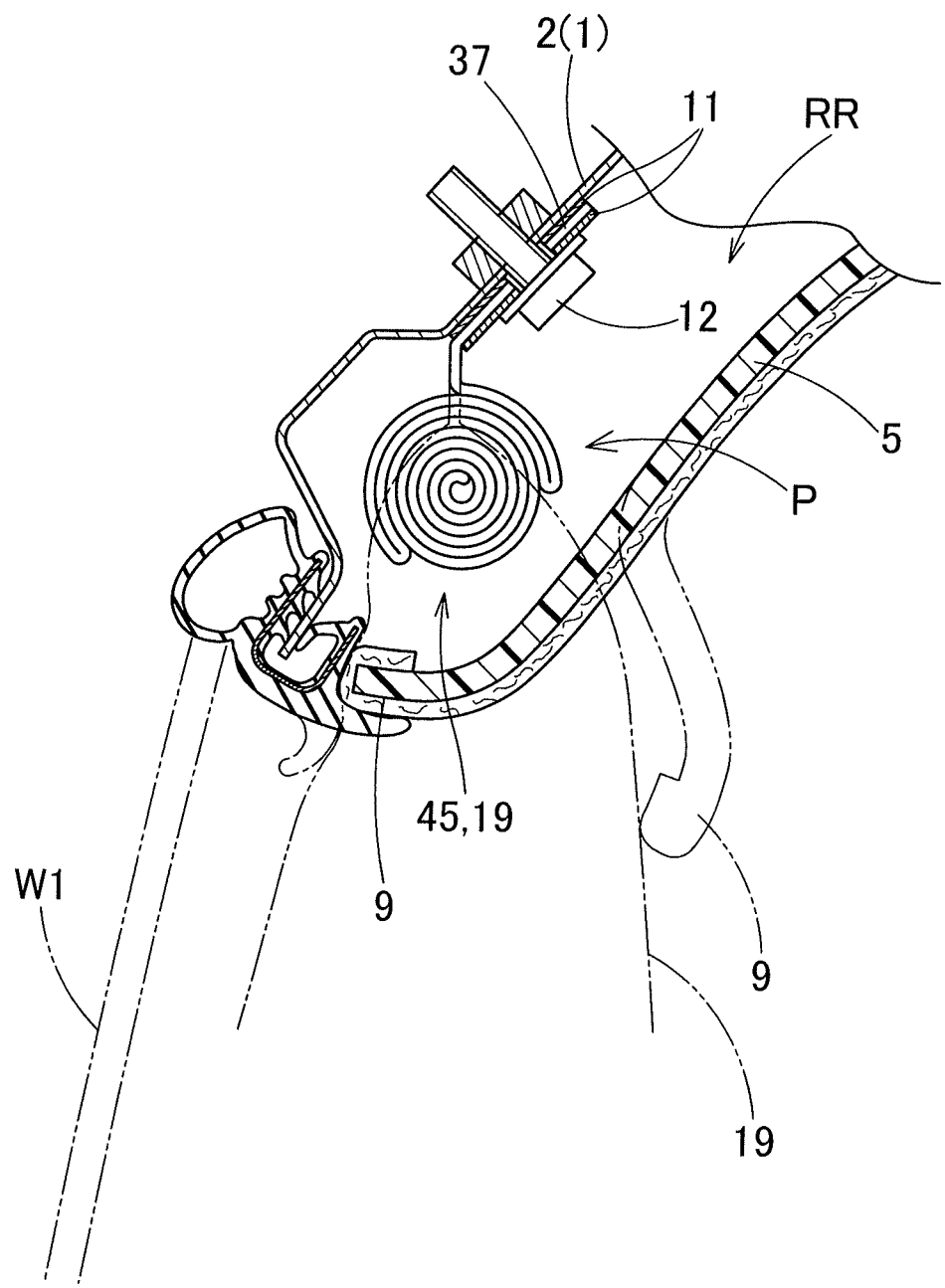
FIG. 2 is a sectional view taken along line in FIG. 1.

As shown in FIGS. 1 and 2, the airbag cover 9 is composed of a lower rim of a front pillar garnish 4 arranged on the front pillar FP and a lower rim of a roof head liner 5 arranged on the roof side rail RR. The front pillar garnish 4 and roof head liner 5 are fabricated of synthetic resin and secured to an inboard side of an inner panel 2 of the vehicle body structure 1 at the front pillar FP and roof side rail RR, respectively. The airbag cover 9 covers an inboard side of the airbag 19, i.e., the folded-up body 45, and is openable when pushed by the airbag 19 under inflation for allowing the airbag 19 to deploy toward an interior of a vehicle.

As shown in FIG. 1, the inflator 14 is substantially columnar in shape and includes at the leading end gas discharge ports (unillustrated) for feeding an inflation gas into the airbag 19. The leading end of the inflator 14 is inserted into a later-described gas inlet port 22 of the airbag 19, and a clamp 17 (FIG. 1) is mounted around the rear end 22a of the gas inlet port 22, thus the inflator 14 is coupled to the airbag 19. The inflator 14 is secured to the inner panel 2 above the center pillar CP by a mounting bracket 15 mounted around to hold the inflator 14 and mounting bolts 16 for securing the mounting bracket 15 to the inner panel 2. The inflator 14 is electrically connected with an unillustrated control of the vehicle via an unillustrated lead wire, and is so designed as to be actuated in response to an actuating signal fed from the control that has detected a side impact of the vehicle V.

Mounting brackets 11 are used to mount the airbag 19 on the inner panel 2. Each of the mounting brackets 11 is comprised of a pair of plates of metal which are applied to inboard and outboard sides of each of later-described mounting portions 37 of the airbag 19 as shown in FIG. 2. Mounting bolts 12 secure the mounting brackets 11, together with the mounting portions 37, to the inner panel 2.

As indicated by double-dotted lines in FIG. 1, when fed with an inflation gas from the inflator 14, the airbag 19 is unfolded from the folded-up configuration and deploys to cover inboard sides of the windows W1 and W2, the center pillar garnish 6 disposed at the center pillar CP between the windows W1 and W2, and the rear pillar garnish 7 disposed at the rear pillar RP at the rear of the window W2.

Figure 3:
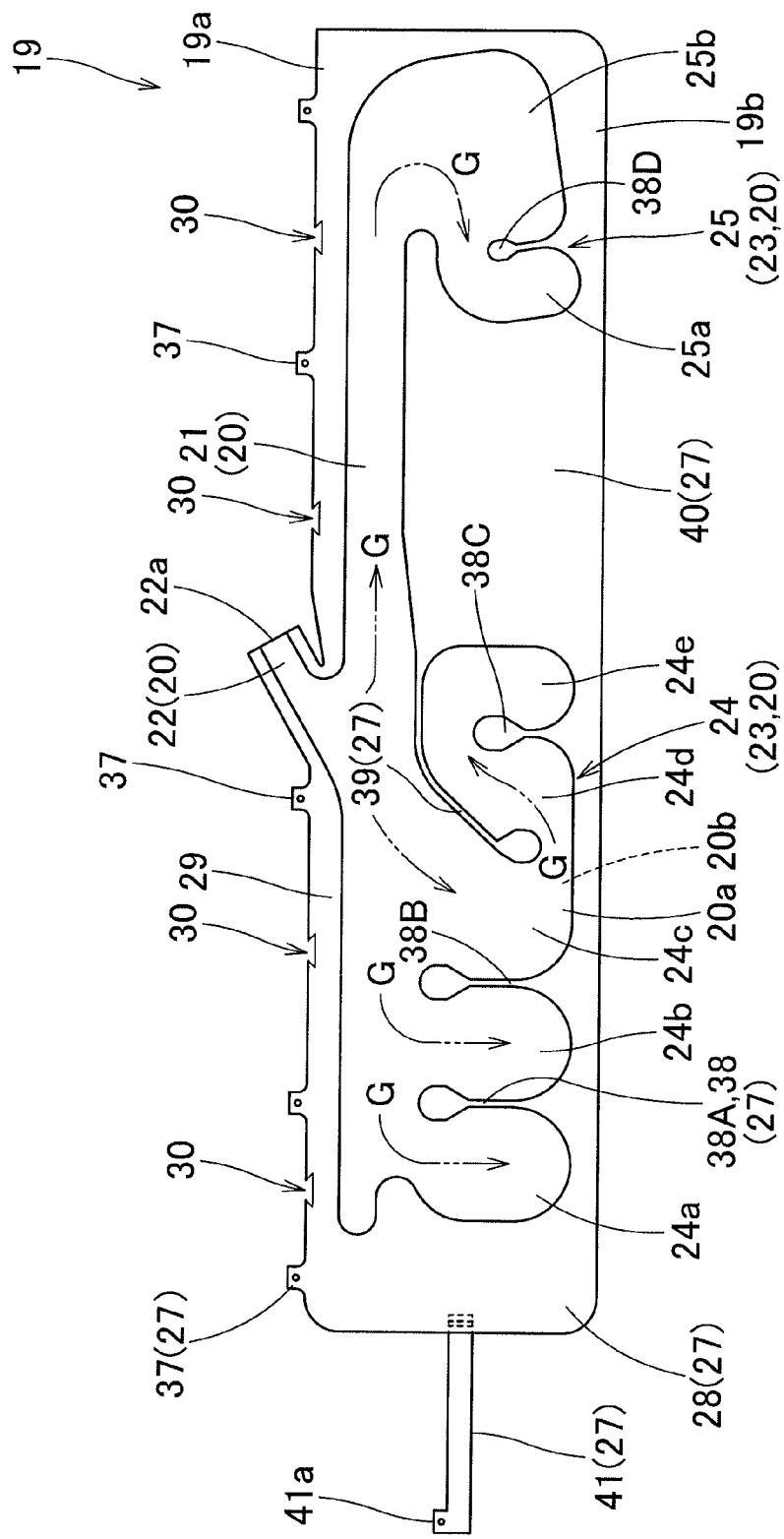
FIG. 3 is a front view of an airbag used in the airbag device of FIG. 1 in an unfolded state.

The airbag 19 of the illustrated embodiment is made by hollow-weaving method using polyamide yarns, polyester yarns or the like. As shown in FIG. 3, the airbag 19 includes a gas admissive portion 20 which is inflatable with an inflation gas in such a manner as to separate an inboard side wall 20a deployable at an inboard side from an outboard side wall 20b deployable at an outboard side, and a non-admissive portion 27 which admits no inflation gas.

The gas admissive portion 20 includes a gas feed path 21, a gas inlet port 22 and a protection inflatable portion 23.

As shown in FIG. 3, the gas feed path 21 extends along an upper edge 19a of the airbag 19 generally in a front and rear direction, and is arranged over an entire area in a front and rear direction of the airbag 19. The gas feed path 21 serves to guide an inflation gas G discharged from the inflator 14 into the protection inflatable portion 23 located below the gas feed path 21. At the generally center in a front and rear direction of the gas feed path 21 is the gas inlet port 22 connected with the inflator 14. The gas inlet port 22 is in gas communication with the gas feed path 21 and projects upward from the gas feed path 21 in an up- and rearwardly rising fashion. The gas inlet port 22 is open at the rear end 22a for receiving the inflator 14, and is jointed with the inflator 14 with a clamp 17 mounted around the gas inlet port 22.

The protection inflatable portion 23 includes a front seat inflatable portion 24 deployable to cover the window W1 at a side of the front seat and a rear seat inflatable portion 25 deployable to cover the window W2 at a side of the rear seat. An inner area of each of the front seat inflatable portion 24 and rear seat inflatable portion 25 are partitioned by later-described partitioning portions 38 and 39, thus regulated in thickness at airbag inflation. The front seat inflatable portion 24 is partitioned by the partitioning portions 38A, 38B, 38C, 39 into five vertical cells 24a, 24b, 24c, 24d and 24e disposed side by side in a front and rear direction. The rear seat inflatable portion 25 is partitioned by the partitioning portion 38D into two vertical cells 25a and 25b adjoining each other in a front and rear direction.

The non-admissive portion 27 includes a peripheral portion 28, mounting portions 37, partitioning portions 38 and 39, a panel portion 40 and a connecting belt 41.

The peripheral portion 28 constitutes an outer peripheral edge of the airbag 19 and is so provided as to enclose the gas admissive portion 21 except the rear end 22a of the gas inlet port 22. The peripheral portion 28 includes at the upper end region 29, which will form the upper edge 19a of the airbag 19 at inflation, means 30 for preventing the tape members 46 which are mounted around the folded-up body 45 as a result of the folding of the airbag 19 from being displaced (namely, displacement-preventing means 30).

Figure 4:
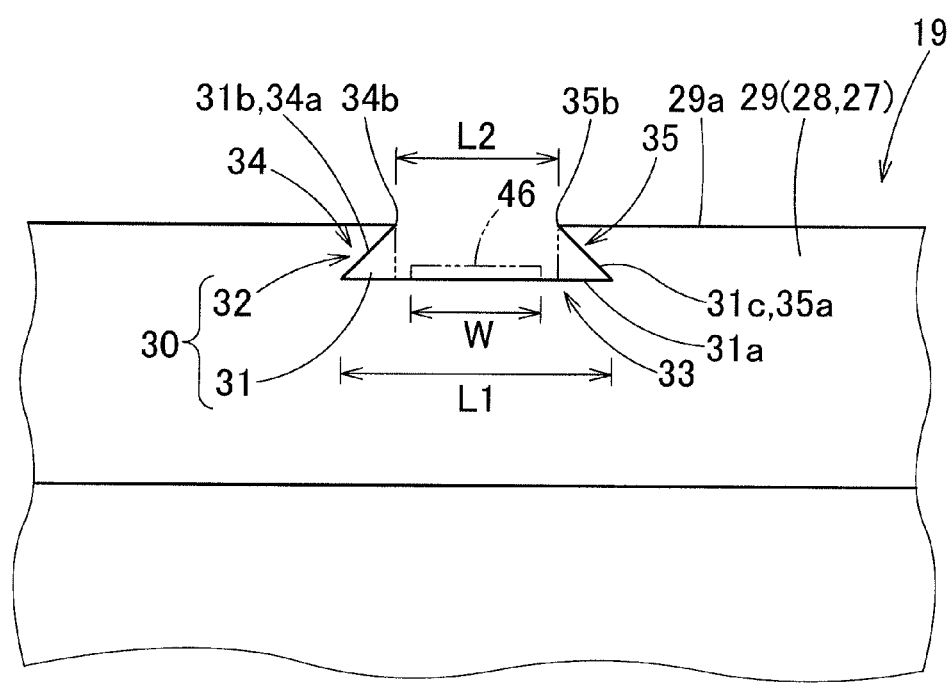
FIG. 4 is a partial enlarged front view of a displacement-preventing means of the airbag of FIG. 3.

As shown in FIG. 4, the displacement-preventing means 30 is composed of a cutout recessed region 31 which is formed by cutting a portion of an end edge 29a out of the upper end region 29, and a peripheral portion 32 located at a periphery of the cutout recessed region 31. As shown in FIG. 3, the displacement-preventing means 30 are located at four positions spaced apart along a front and rear direction so as to correspond to the constellation of the tape members 46. As shown in FIG. 4, the cutout recessed region 31 is formed into a generally trapezoid which is open upward and has a bottom side at the bottom. That is, the cutout recessed region 31 includes a lower edge 31a extending along a front and rear direction, a front edge 31b and a rear edge 31c which extend from the front and rear ends of the lower edge 31a, respectively, in such an inclined fashion that the leading ends (upper ends) are directed toward the center in a front and rear direction of the cutout recessed region 31. In this embodiment, a lower peripheral portion 33 of the peripheral portion 32 of the cutout recessed region 31, which forms the lower edge 31a, constitutes a bound region at which the folded-up body 45 is bound by the tape member 46. A front peripheral portion 34 and a rear peripheral portion 35 of the peripheral portion 32 of the cutout recessed region 31, which form the front edge 31b and the rear edge 31c, respectively, constitute rising regions that rise from the lower peripheral portion (bound region) 33 and are located in front of and at the rear of the tape member 46. Further, end edges 34a and 35a of the front peripheral portion 34 and rear peripheral portion 35 constitute regulating surfaces that prevent the tape member 46 from being displaced relative to the folded-up body 45. As described above, the end edges 34a and 35a of the front peripheral portion 34 and rear peripheral portion 35 are so inclined relative to an up and down direction (i.e., relative to a left and right direction of the folded-up body 45) that the leading ends (upper ends 34b and 35b) are directed toward the tape member 46, toward the center in a front and rear direction between the end edges 34a and 35a. In the illustrated embodiment, an inclined angle of each of the front edge 31b and rear edge 31c (or end edges 34a and 35a of the front peripheral portion 34 and rear peripheral portion 35) relative to the lower edge 31a is about 45°. A length L1 of the lower edge 31a is greater than a width W of the tape member 46, as shown in FIG. 4. In this specific embodiment, a clearance L2 (FIG. 4) between the upper ends of the front peripheral portion 34 and rear peripheral portion 35 (or between the upper ends 34b and 35b of the end edges 34a and 35a) is also greater than the width W of the tape member 46 so as to facilitate the binding of the tape member 46. Specifically, the length L1 of the lower edge 31a in this specific embodiment is about twice as long as the width W of the tape member 46.

The mounting portions 37 serve to mount the airbag 19 on the inner panel 2 of the vehicle body structure 1, and are formed at a plurality of positions on the upper edge 19a of the airbag 19 along a front and rear direction, in such a manner as to protrude from the upper end region 29 of the peripheral portion 28. In the illustrated embodiment, the mounting portions 37 are located at five positions on the upper edge 19a of the airbag 19. Each of the mounting portions 37 is provided with a mounting hole (reference numeral omitted) for receiving a mounting bolt 12.

The partitioning portions 38 and 39 are disposed within areas of the front seat inflatable portion 24 and rear seat inflatable portion 25 and partition the inflatable portions 24 and 25 into vertical cells 24a, 24b, 24c, 24d, 24e, 25a and 25b. Each of the partitioning portions 38A, 38B, 380 and 38D is so provided as to extend upward from the lower end region of the peripheral portion 28, and the partitioning portion 39 extends forward and downward from an upper front end of the panel portion 40. The panel portion 40 is a generally rectangle in shape and located between the front seat inflatable portion 24 and rear seat inflatable portion 25 below the gas feed path 21. The connecting belt 41 is provided separately from the airbag 19 and is sewn to the front end of the airbag 19. The connecting belt 41 is formed into a generally band extending forward from a generally center in an up and down direction of the airbag 19 in a protruding fashion, and includes at the leading end a mounting portion 41a to be secured to the inner panel 2 of the vehicle body structure 1, as the mounting portions 37.

Figure 5:
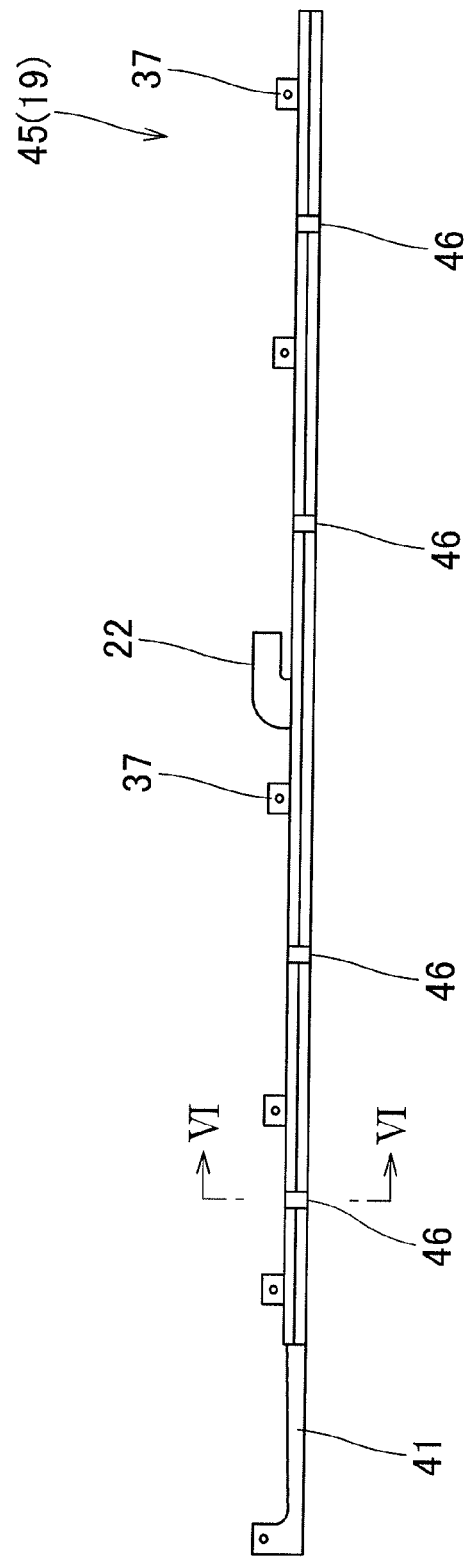
FIG. 5 is a front view of a folded-up body of the airbag of FIG. 3 bound by a tape member.
Figure 6:
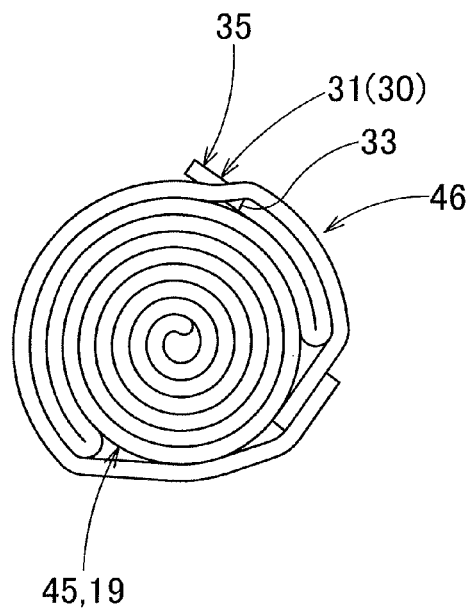
FIG. 6 is a schematic sectional view taken along line VI-VI of FIG. 5.
Figure 7:
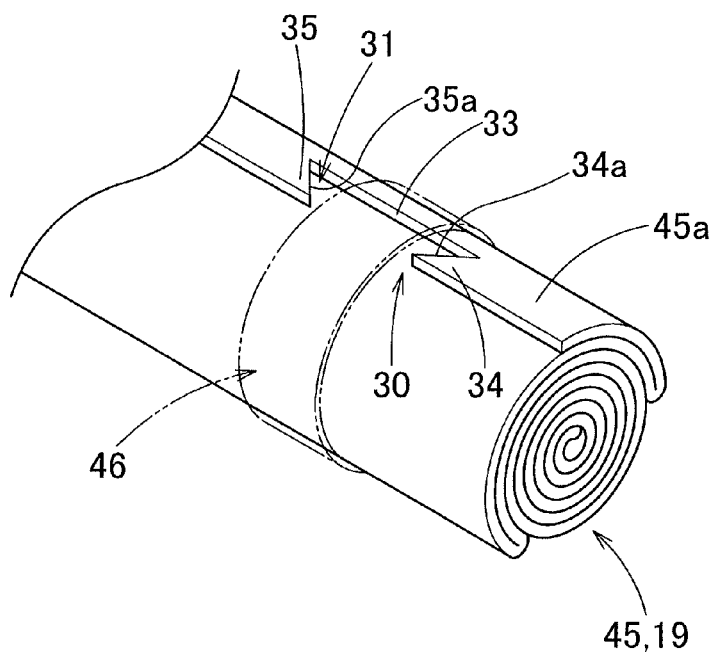
FIG. 7 is a schematic partial enlarged perspective view showing the way the tape member is wrapped around the folded-up body.

Mounting of the head-protecting airbag device M on a vehicle V is now described. From an unfolded state where the inboard side wall 20a and outboard side wall 20b overlap each other, the airbag 19 is folded up in such a fashion as to bring the lower edge 19b close to the upper edge 19a and reduced in dimension in an up and down direction. Thus a folded-up body 45 is provided. More specifically, the gas feed path 21, i.e., an upper end region of the airbag 19, is folded in a bellows fashion on a plurality of creases extending along a front and rear direction, while the protection inflatable portion 23, which is located below the gas feed path 21, is rolled toward an outboard side from the lower edge 19b, thereby forming the folded-up body 45 which is elongated in a front and rear direction as shown in FIGS. 2, 5 and 6. As shown in FIG. 7, the cutout recessed regions 31 constituting the displacement-preventing means 30 are exposed on the top plane 45a of the folded-up body 45.

Thereafter, the tape members 46 are wrapped around the airbag 19. The tape members 46 keep a folded-up configuration of the airbag 19 and prevent the folded-up configuration from collapsing, and are tearable upon deployment of the airbag 19. The tape members 46 are flexible band-shaped members. In the illustrated embodiment, the tape members 46 are formed of non-woven fabric, and when bound around the folded-body 45, opposite ends of each of the tape members 46 are attached together by fusion welding, thereby keeping the folded-up configuration of the folded-up body 45. That is, the tape members 46 are not provided with an adhesive or a bonding layer which would be adhered to the folded-up body 45 upon mounting. More specifically, the tape members 46 are wrapped around the folded-up body 45 at four positions along a front and rear direction where the cutout recessed regions 31 are formed, and each of them is wrapped on an outer circumference of the lower peripheral portion 33 of the peripheral portion (i.e., bound region) 32 (FIGS. 6 and 7).

Thereafter, the mounting bracket 15 is mounted on the inflator 14 and the inflator 14 is connected with the gas inlet port 22 of the airbag 19 with the clamp 17. The mounting brackets 11 are attached to the mounting portion 37, thereby forming an airbag module.

Subsequently, the mounting bracket 15 is located at a predetermined position of the inner panel 2 and fastened with bolts 16 to secure the inflator 14 to the inner panel 2, and the mounting portions 37 are attached to the inner panel 2 together with the mounting brackets 11 with mounting bolts 12. Thus the airbag module is mounted on the vehicle body structure 1. Then, an unillustrated lead wire extending from a suitable control for actuating the inflator is connected to the inflator 14. If then the front pillar garnish 4, the roof head liner 5 and further the center pillar garnish 6 and rear pillar garnish 7 are mounted on the vehicle body structure 1, the head-protecting airbag device M is mounted on the vehicle V.

After the airbag device M is mounted on the vehicle V, when the inflator 14 is actuated, an inflation gas G emitted from the inflator 14 flows into the airbag 19, and the airbag 19 then breaks the tape members 46, pushes and opens the airbag cover 9 composed of lower rims of the front pillar garnish 4 and roof head liner 5, and deploys downward from the housing area P and covers inboard sides of the windows W1, W2, the center pillar CP, and the rear pillar RP, as indicated by double-dotted lines in FIG. 1.

The head-protecting airbag device M includes at the upper end region 29 of the peripheral portion 28 which will be the upper edge 19a of the airbag 19 at deployment the displacement-preventing means 30 that prevents the tape members 46 from being displaced relative to the folded-up body 45. Therefore, the tape members 46 will be prevented from slipping considerably against the folded-up body 45. The displacement-preventing means 30 will prevent the displacement of the tape members 46 until the folded-up body 45 is mounted on a vehicle also in an instance using such a tape member 46 as in this specific embodiment which has no adhesive layer and is merely wrapped around the folded-up body 45 and connected at the opposite ends. Further, since the displacement-preventing means 30 is provided by forming recessed regions in the peripheral portion 28 of the airbag 19 itself, it can be formed merely by changing the outer contour of the airbag 19 (the peripheral portion 28) when cutting the airbag 19 out of a base cloth, and requires no separate parts, which will not increase the manufacturing cost and the number of parts.

Therefore, the head-protecting airbag device M of the embodiment will be capable of preventing the tape members 46 for keeping the folded-up body 45 in a folded-up configuration from being displaced considerably.

In the head-protecting airbag device M, the displacement-preventing means 30 includes the lower peripheral portion (or the bound region) 33 at which the tape member 46 is wrapped around the folded-up body 45 and the front peripheral portion 34 and rear peripheral portion 35 (i.e., the rising regions) which are so configured as to rise from the lower peripheral portion 33 in front of and at the rear of the tape member 46. Further, the end edges 34a and 35a of the front peripheral portion 34 and rear peripheral portion 35 facing towards the tape member 46 serve as the regulating surfaces that prevent the displacement of the tape member 46. With this configuration, although the tape member 46 is likely to move forward or backward relative to the folded-up body 45, the front peripheral portion 34 and rear peripheral portion 35 so configured as to rise from the lower peripheral portion 33 in front of and at the rear of the tape member 46 will engage with end edges 46a of the tape member 46 and adequately hold the tape member 46 from moving forward or backward, thereby preventing the tape member 46 from slipping forward or backward relative to the folded-up body 45.

In the head-protecting airbag device M, moreover, the displacement-preventing means 30 is composed of the cutout recessed region 31 which is formed by cutting an edge portion out of the upper end region 29 and the peripheral portion 32 located at a periphery of the cutout recessed region 31. The end edges 34a and 35a of the front peripheral portion 34 and rear peripheral portion 35 (i.e., the regulating surfaces) are so inclined relative to a left and right direction that the leading ends (the upper ends 34b and 35b) are directed toward the tape member 46, toward the center in a front and rear direction between the end edges 34a and 35a. With this configuration, when the tape member 46 slips forward or backward against the folded-up body 45, the tape member 46 will fit into an acute-angled corner formed between the end edges 34a and 35a which are so inclined as to direct the leading ends inward in a front and rear direction and the lower peripheral portion 33 of the cutout recessed region 31 which constitutes the bound region at which the tape member 46 is wrapped, such that the tape member 46 will stay held at a peripheral region (at the front peripheral portion 34 and rear peripheral region 35) of the end edges 34a and 35a and be adequately prevented from climbing over the front peripheral portion 34 and rear peripheral region 35. That is, the displacement-preventing means 30 will further adequately prevent the tape member 46 from slipping considerably forward or backward against the folded-up body 45. If such an advantage does not have to be considered, the following configuration will also be conceivable: the displacement-preventing means depicted with double-dotted lines in FIG. 4 is comprised of a recessed region formed at the upper end region, and end surfaces of the rising regions facing towards the tape member extend generally along an up and down direction (extend along a left and right direction of the folded-up body, or extend generally orthogonally to the lower edge of the recessed region). If the height of the rising regions (i.e., the length of the end surfaces facing towards the tape member) is sufficiently great, this configuration will also adequately prevent the slipping of the tape member although the end surfaces of the rising regions are configured to extend generally along an up and down direction.

Especially in this specific embodiment, since the inclined angle of each of the end edges 34a and 35a relative to the lower peripheral portion 33 is 45°, the front peripheral portion 34 and rear peripheral portion 35 protrude considerably toward the center there between in a front and rear direction (i.e., toward the tape member 46), and clearances between each of the end edges 34a and 35a and the lower edge 31a are tapered. Accordingly, if the tape member 46 slips and the end edge 46a of the tape member 46 goes into the tapered clearance between each of the end edges 34a and 35a and the lower peripheral portion 33 (i.e., lower edge 31a), the tape member 46 will behave as if it dug into the clearance as shown in FIG. 8, thereby the tape member 46 will be adequately kept from climbing over the front peripheral portion 34 and rear peripheral portion 35 and further slipping.

Figure 9:
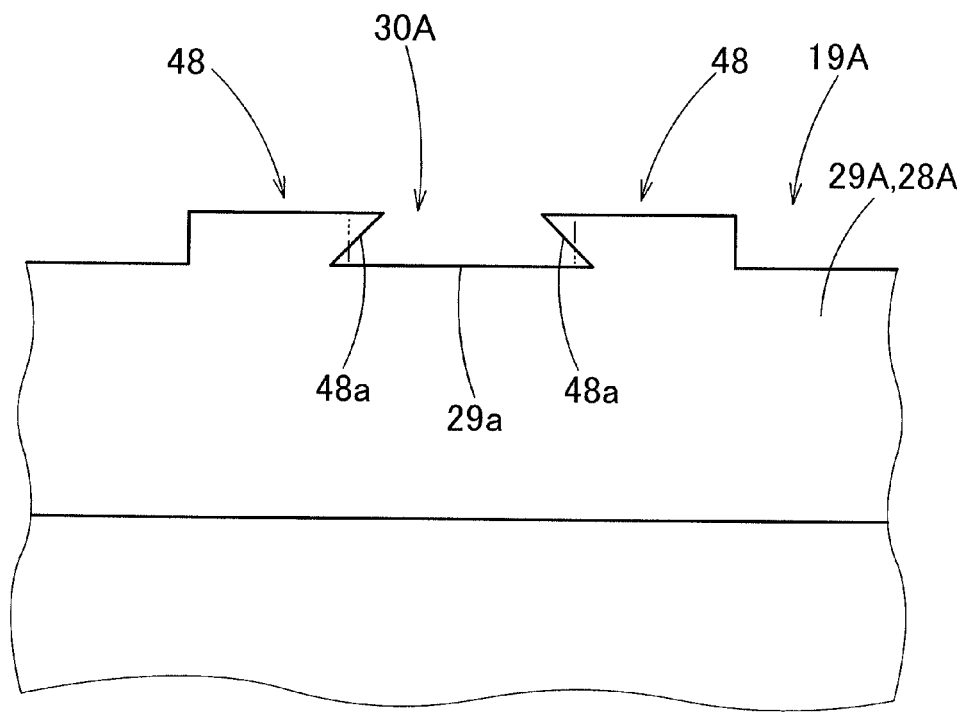
FIG. 9 is a partial enlarged front view of a displacement-preventing means of an alternative embodiment.

Although the displacement-preventing means 30 of the foregoing embodiment is composed of the cutout recessed region 31 formed by cutting a generally trapezoidal portion out of the upper end region 29 of the peripheral portion 28 and the peripheral portion 32 located in a periphery of the cutout recessed region 31, an outer contour of the displacement-preventing means should not be limited thereby. By way of example, a displacement-preventing means 30A shown in FIG. 9A is composed of a pair of generally rectangular projecting regions 48 that are formed at an upper end region 29A of a peripheral portion 28A in an airbag 19A in such a manner as to be disposed side by side and protrude upward from the upper end region 29A. The projecting regions 48 are generally symmetric in a front and rear direction and opposing edge regions 48*a* are so inclined relative to an end edge 29*a* of the upper end region 29A that leading ends (upper ends) are directed toward the center in a front and rear direction. In the displacement-preventing means 30A, the bound region is comprised of the end edge 29*a* of the upper end region 29A disposed between the projecting regions 48 while the projecting regions 48 constitute the rising regions. The opposing edge regions 48*a* of the projecting regions 48 (i.e., the edge regions 48*a* located toward the center in a front and rear direction) constitute the regulating surfaces. It will also be appreciated that the edge regions of the projecting regions located toward the center in a front and rear direction may extend generally along an up and down direction (extend along a left and right direction of the folded-up body, or extend generally orthogonally to the end edge 29*a* of the upper end region 29A), as indicated by double-dotted lines in FIG. 9.

Figure 10:
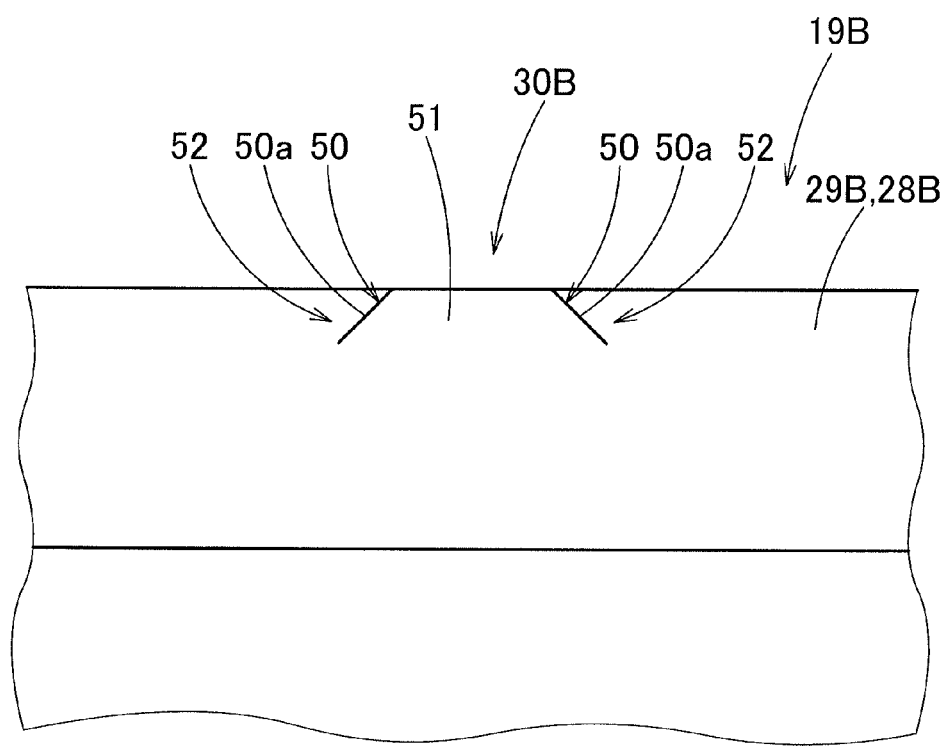
FIG. 10 is a partial enlarged front view of a displacement-preventing means of another alternative embodiment.

FIG. 10 depicts a further alternative embodiment of the displacement-preventing means of the invention. A displacement-preventing means 30B is composed of a pair of slits 50 that are formed by slitting an upper end region 29B of a peripheral portion 28B from an end edge of the upper end region 29B so as to be disposed side by side in a front and rear direction. The slits 50 are generally symmetric in a front and rear direction and are so inclined relative to the end edge of the upper end region 293 as to expand or separate away from each other toward the leading ends or lower ends. In this displacement-preventing means 30B, a region between the slits 50 constitutes a bound region 51 at which a tape member is wrapped and regions located in front of and at the rear of the slits 50 constitute rising regions 52 which will rise from the bound region 51 when the tape member is wrapped. Further, end edges of the regions located in front of and at the rear of the slits 50 (i.e., peripheral regions 50*a* of the slits 50) form regulating surfaces. The slits may also be formed to extend generally along an up and down direction (extend along a left and right direction of the folded-up body, or extend generally orthogonally to the end edge of the upper end region), in this configuration as well. This displacement-preventing means 30B formed only of the slits will exert the same working effects as the displacement-preventing means 30 and 30A. However, the bound region will be more visible when a region constituting the bound region is recessed relative to a surrounding area. Accordingly, considering a work efficiency in wrapping a tape member around a folded-up body, it will be more preferable to configure the bound region to be recessed relative to a surrounding area as in the displacement-preventing means 30 and 30A.

Although the foregoing embodiments have shown an instance where the displacement-preventing means 30 are disposed at four spaced-apart positions over an entire area in a front and rear direction of the folded-up body 45, the number and position of the displacement-preventing means should not be limited thereby. For instance, it is conceivable, in a head-protecting airbag device in which a tape member would be wrapped around a region of a folded-up body in front of a foremost mounting portion or at the rear of a rearmost mounting region, to provide at least one displacement-preventing means in front of the foremost mounting portion and/or at the rear of the rearmost mounting region. Since the displacement-preventing means in the head-protecting airbag device M according to the present invention helps prevent slipping of a tape member once wrapped around a folded-up body adequately, the invention will be preferably applied to such a head-protecting airbag device that a tape member with no adhesive layer would be wrapped around a region in front of a foremost mounting portion or at the rear of a rearmost mounting region.

What is claimed is:

1. A head-protecting airbag device having an airbag that is adapted to be housed in a folded-up configuration in a housing area located at an upper periphery of a window of a vehicle on an inboard side of a vehicle, the airbag being inflatable with an inflation gas and deployable over an inboard side of the window, the airbag comprising:
    a folded-up body that is a state of the airbag obtained as a result of folding the airbag in such a fashion as to bring a lower edge of the airbag close to an upper edge of the airbag, the folded-up body being so elongated as to extend generally along a front and rear direction of a vehicle, and being to be wrapped by a tearable tape member that is formed into a flexible band and is wrapped generally along a circumferential direction of the folded-up body in order to prevent a folded-up configuration of the folded-up body from collapsing;
    a gas admissive portion that is inflatable with an inflation gas in such a fashion as to separate an inboard side wall deployable at an inboard side from an outboard side wall deployable at an outboard side;
    a non-admissive portion that admits no inflation gas, the non-admissive portion including a peripheral portion that constitutes an outer peripheral edge of the airbag; and
    displacement-preventing means for preventing the tape member from being displaced relative to the folded-up body, the displacement-preventing means being formed at an upper end region of the peripheral portion which will be an upper edge of the airbag at deployment, the displacement-preventing means comprising a recessed region or a projecting region that is formed on the airbag itself at least either in front of or at the rear of a location at which the tape member is to be wrapped so as to be engageable with an end edge of the tape member and prevent the tape member from being displaced.

2. The head-protecting airbag device of claim 1, wherein the displacement-preventing means comprises a bound region at which the tape member is wrapped around the folded-up body and a pair of rising regions that are so configured as to rise from the bound region in front of and at the rear of the tape member, such that end surfaces of the rising regions facing towards the tape member serve as regulating surfaces that are engageable with the end edges of the tape member and prevent the displacement of the tape member.

3. The head-protecting airbag device of claim 2, wherein:
    the displacement-preventing means is formed by cutting an edge portion out of the upper end region of the peripheral portion; and
    the regulating surfaces of the rising regions located in front of and at the rear of the tape member are so inclined relative to a left and right direction that leading ends of the regulating surfaces are directed toward the tape member, toward a center in a front and rear direction between the regulating surfaces.

4. The head-protecting airbag device of claim 3, wherein an inclined angle of each of the regulating surfaces relative to the bound region is 45°.

5. The head-protecting airbag device of claim 2, wherein:
    the displacement-preventing means is composed of a pair of projecting regions that are formed at the upper end region of the peripheral portion in such a manner as to be disposed side by side and protrude upward from the upper end region;

a region of the upper end region between the projecting regions constitutes the bound region;

the projecting regions constitute the rising regions; and edge regions of the projecting regions opposing each other in a front and rear direction constitute the regulating surfaces.

6. The head-protecting airbag device of claim 5, wherein the edge regions of the projecting regions opposing each other in a front and rear direction and constituting the regulating surfaces are so inclined relative to a left and right direction that upper ends thereof are directed toward a center in a front and rear direction between the edge regions.

7. The head-protecting airbag device of claim 2, wherein:

the displacement-preventing means is composed of a pair of slits that are formed by slitting the upper end region of the peripheral portion from an end edge of the upper end region so as to be disposed side by side in a front and rear direction;

a region between the slits constitutes the bound region;

regions located in front of and at the rear of the slits constitute the rising regions; and end edges of the regions located in front of and at the rear of the slits constitute the regulating surfaces.

8. The head-protecting airbag device of claim 7, wherein the slits are so inclined relative to a left and right direction as to separate away from each other toward lower ends thereof.

* * * * *